June 24, 1930.                C. L. HEISLER                1,768,403
                              FILM DRIVING MEANS
                             Filed Sept. 18, 1928
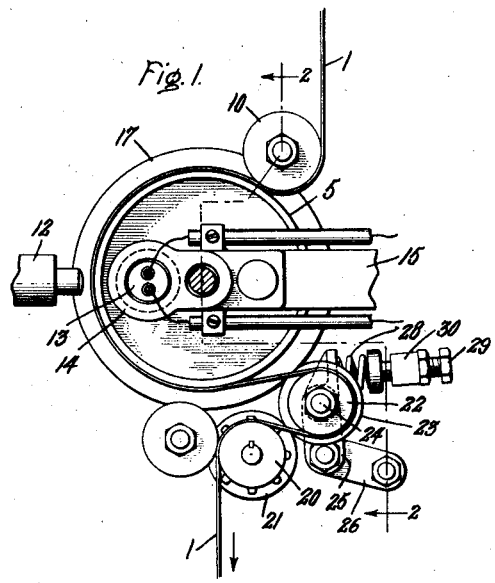
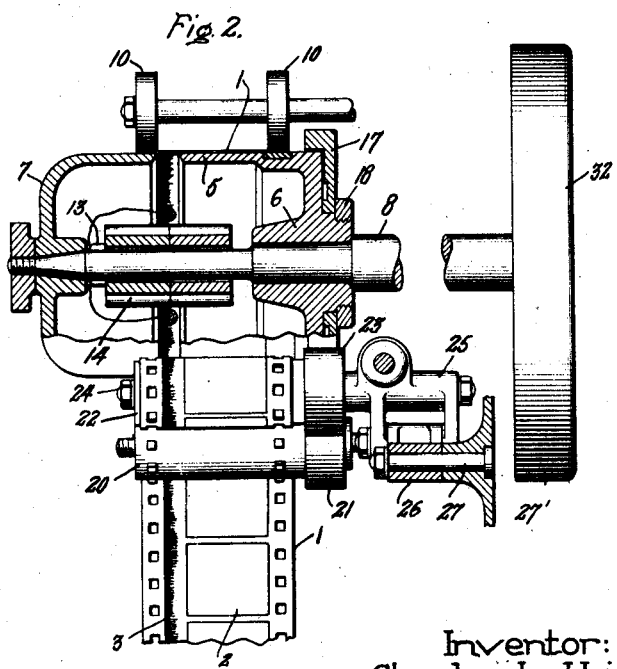
Inventor:
Charles L. Heisler,
by Charles E. Tullar
His Attorney.

Patented June 24, 1930

1,768,403

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

FILM-DRIVING MEANS

Application filed September 18, 1928. Serial No. 306,684.

My invention relates to the recording of sound on a film and to the reproduction of sound from a film record. More particularly it relates to mechanism for driving the film at the point at which the record is made thereon or at the point at which the record is translated therefrom as the case may be. One object of my invention is to provide an improved film driving mechanism which shall relieve the film of excessive tension. Another object is to provide a film driving mechanism including a sprocket with which mechanism the movement of the film shall be less subject to the effect of defective sprocket holes and weak portions therein. A further object of my invention is to provide a film driving mechanism including a sprocket wherein a stretched or shrunken film shall nevertheless have a smooth sprocket action.

My invention will be better understood from the following description taken in connection with the accompanying drawing, and its scope will be pointed out in the appended claims.

Referring to the drawing, Fig. 1, is a fragmentary view of apparatus involving my invention for reproducing sound from a photographic film record and Fig. 2 is a cross section of the same taken on line 2—2 of Fig. 1.

I have chosen to illustrate my invention as applied to apparatus for reproducing sound from a photographic film record although it will be understood that it is also applicable to apparatus for recording sound on a film. The film 1 which I have chosen to show in connection with my apparatus has a series of motion pictures 2 thereon and a sound record 3 of the variable width type extending along one side of the picture record. A narrow light beam of the order of one mil or less is passed through the sound record portion of the moving film into a photo-electric cell, the resulting varying current from which after suitable amplification may be fed to a loud speaker or other translating device. At the point at which the light beam engages the film it is essential for faithful recording or reproduction as the case may be that the film be firmly supported and be moved with a perfectly uniform rate. In the drawing I have shown the film 1 supported by the drum 5 which is formed in two parts 6 and 7, the former being fixed to the freely rotatable shaft 8 while the latter is detachably mounted on the reduced end portion of the same shaft. The two drum parts 6 and 7 are spaced apart a distance slightly more than the maximum width of the sound record and the film is guided on the drum in such a manner that the sound record lies opposite the space between the drum parts. A pair of suitable rollers 10 press the film against the drum face. By means of a suitable optical system, a portion of which is shown at 12, a light beam of the desired dimensions is directed on that portion of the film bearing the sound record, the point of interception of the beam and film being termed the point of record translation, and within the drum in a position to receive the light beam after passing through the sound record is the photo-electric cell 13. The cell is secured in the bracket 14 which surrounds the reduced end of shaft 8 and which is supported in a fixed position by the arm 15 extending out through the space between the two drum parts. Part 6 of the drum is provided with the friction roll 17 which is frictionally held in engagement therewith by the nut 18, the adjustment thereof being such that slipping normally does not occur between the drum and the roll 17. The provision of the yielding frictional engagement between the members 6 and 17 is in the nature of a safeguard to save the film from an excessive strain.

Sprocket 20 which is driven at uniform speed by suitable means not shown, such for example as a synchronous electric motor, has the friction roll 21 at one end thereof. Between the sprocket 20 and the drum 5 the film passes in a loop over the film roll 22 at one end of which is the friction roll 23 which is held in yielding engagement with the friction rolls 17 and 21. Film roll 22 and its associated friction roll are rotatably mounted on the shaft 24 which shaft is carried by a jointed bracket comprising the members 25 and 26, the latter being pivoted on the fixed pin 27 shown supported by a boss on the interior of the enclosing casing 27'. The degree of pressure desired between friction roll 23 and friction rolls 17 and 21 is obtained by the spring 28 whose tension may be varied by means of the adjusting screw 29 threaded in the fixed post 30.

I have found in machines heretofore constructed wherein the drum was driven solely by the tension of the film passing over it that at times, for example when starting, the film between the sprocket and the drum would be subjected to a dangerously high tension. Vibrations also would be transmitted to the drum if the film contained defective sprocket holes or weak spots or if the sprocket action of the film were imperfect such as might result from either a stretching or a shrinkage of the film. By means of the apparatus which I have illustrated I avoid these disadvantages. I drive the drum jointly by the film and by a positive connection with the sprocket. I construct the drum, the film roll and the sprocket each having a diameter so related to the diameter of its respective friction roll that when using a film of standard thickness there shall be no slippage between the film and the drum but there shall be a slight forward creepage of the film roll relative to the film thereon. Thus the roll 22 acts in the nature of a capstan, that portion of the film between the roll and the sprocket being under less tension than that portion between the roll and the drum. It will be noted that the film makes a reverse bend in passing from the sprocket to the roll and the natural resilience of the film in this portion where the tension is light serves to absorb a large part of the sprocket tooth vibrations before they can reach the drum. A further advantage of feeding the film to the sprocket at a light tension is that if the film is appreciably stretched it will not be forced to the bottom of each tooth immediately as the successive teeth engage it, hence better sprocket action results and less sprocket tooth vibration is set up. If desired, greater uniformity in speed of the film may be obtained by the use of a flywheel on the drum shaft or on the sprocket shaft or on both. In the drawing I have shown the drum shaft provided with the flywheel 32. If desired also the several friction rolls may be provided with tires of rubber or the like to increase the traction.

What I claim as new and desire to secure by Letters Patent of the United States, is:

1. Film driving means including a drum, a film roll and a driven member over which members a film is adapted to pass serially, said members having friction rolls associated therewith and arranged in engagement with one another to supply a driving torque to the drum from the driven member through the film roll.

2. Film driving means including a drum, a driven sprocket, and a yieldably mounted film roll over which members a film is adapted to pass serially, said members having friction rolls connected therewith and engaging one another to supply a positive driving torque to the drum from the sprocket through the film roll.

3. Film driving mechanism including a drum, a sprocket, a driving connection therebetween, and a roll arranged to engage a loop in a film passing from the drum to the sprocket, said roll being driven from the sprocket at a speed slightly greater than the speed of the film thereon.

4. In film driving mechanism having a sprocket adapted to engage and move a film past a point of record translation, means for reducing vibration in the film at said point arising from sprocket tooth action therewith including a roll arranged to engage said film between the sprocket and said point and means for driving the roll at a speed to cause a slight forward creepage of the roll relative to the film.

5. Film driving mechanism including a film roll and a driving sprocket over which a film is adapted to pass successively, and a driving connection between the sprocket and the roll for rotating the roll at a speed slightly greater than the speed at which the film is moved by the sprocket.

6. Film driving mechanism including a driving sprocket adapted to be engaged by and to move a film, a roll arranged to engage the film as it approaches the sprocket and means for rotating the roll from the sprocket to decrease the tension of the film approaching the sprocket.

7. Film supporting and driving mechanism including a drum, a film roll and a driving sprocket over which a film is adapted to pass serially, friction rolls associated with each of said members arranged to form a driving train from the sprocket to the drum, the film roll being constructed to have a peripheral speed slightly greater than the speed of the film thereon.

8. Film supporting and driving mechanism including a drum, a film roll, and a driving sprocket over which a film is adapted to pass serially, a flywheel fixed to the drum, a friction roll frictionally secured to the drum, a friction roll fixed to the sprocket, a friction roll fixed to the film roll and arranged yieldingly to engage the friction rolls of the drum and the sprocket, the diameters of the friction rolls being such that no slipping occurs between the film and the drum but there occurs a slight forward creeping of the idler relative to the film thereon.

In witness whereof, I have hereunto set my hand this 17th day of September, 1928.

CHARLES L. HEISLER.